United States Patent
Zhang et al.

(10) Patent No.: US 11,791,684 B2
(45) Date of Patent: Oct. 17, 2023

(54) METHOD AND SYSTEM FOR ELECTRICALLY INSULATING PORTIONS OF AN ELECTRIC MACHINE

(71) Applicant: GE Aviation Systems LLC, Grand Rapids, MI (US)

(72) Inventors: Wei Zhang, Niskayuna, NY (US); Lili Zhang, Mason, OH (US); John Russell Yagielski, Scotia, NY (US); Karim Younsi, Ballston Lake, NY (US); Peter Francis Finigan, Clifton Park, NY (US); Jason Rueda, Niskayuna, NY (US); Konrad Roman Weeber, Saratoga Springs, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 472 days.

(21) Appl. No.: 16/919,471

(22) Filed: Jul. 2, 2020

(65) Prior Publication Data

US 2022/0006346 A1   Jan. 6, 2022

(51) Int. Cl.
| | |
|---|---|
| *H02K 3/40* | (2006.01) |
| *H02K 11/40* | (2016.01) |
| *B64D 27/24* | (2006.01) |
| *F02C 6/00* | (2006.01) |
| *H02K 3/24* | (2006.01) |
| *H02K 7/18* | (2006.01) |
| *H02K 9/19* | (2006.01) |

(52) U.S. Cl.
CPC .............. *H02K 3/40* (2013.01); *B64D 27/24* (2013.01); *F02C 6/00* (2013.01); *H02K 3/24* (2013.01); *H02K 7/1823* (2013.01); *H02K 9/19* (2013.01); *H02K 11/40* (2016.01)

(58) Field of Classification Search
CPC .......... H02K 3/40; H02K 3/24; H02K 7/1823; H02K 9/19; H02K 11/40; H02K 15/105; H02K 3/345; H02K 3/38; H02K 5/225; H02K 3/04; H02K 21/16; H02K 1/20; H02K 3/30; B64D 27/24; B64D 2027/026; F02C 6/00; Y02T 50/60
USPC ........................................... 310/54, 179–210
See application file for complete search history.

(56) References Cited

U.S. PATENT DOCUMENTS

| | | | |
|---|---|---|---|
| 3,867,245 A | 2/1975 | Herman | |
| 5,093,598 A | 3/1992 | Fort | |
| 5,654,095 A * | 8/1997 | Yin | H02K 3/34 |
| | | | 174/120 SR |
| 6,060,162 A * | 5/2000 | Yin | H02K 3/30 |
| | | | 174/120 SR |
| 6,288,341 B1 | 9/2001 | Tsunoda et al. | |
| 6,746,758 B2 | 6/2004 | Tsunoda et al. | |
| 6,940,203 B2 | 9/2005 | Kogan et al. | |
| 6,991,845 B2 | 1/2006 | Levit et al. | |
| 7,294,788 B2 | 11/2007 | Yoshida et al. | |

(Continued)

FOREIGN PATENT DOCUMENTS

JP           S 6277040      *   4/1987

*Primary Examiner* — Ahmed Elnakib
(74) *Attorney, Agent, or Firm* — McGarry Bair PC (57) ABSTRACT

An electric winding assembly comprising a conductor core which includes at least a first end and a distal second end, an insulation layer overlying the conductor core, and a conductive shield layer overlying the insulation layer. The conductive shield layer further having a terminal end conductively connected with the conductive shield layer.

20 Claims, 9 Drawing Sheets

(56) References Cited

U.S. PATENT DOCUMENTS

| | | |
|---|---|---|
| 7,405,361 B1 | 7/2008 | Lester et al. |
| 7,634,852 B2 | 12/2009 | Sternberg et al. |
| 10,199,136 B2 | 2/2019 | Mabuchi et al. |
| 10,700,568 B2 | 6/2020 | Sullivan et al. |
| 2003/0188885 A1* | 10/2003 | Niinobe ............... H02G 15/103 |
| | | 174/73.1 |
| 2012/0161570 A1* | 6/2012 | Schutten ................ H02K 3/487 |
| | | 310/215 |
| 2014/0300239 A1 | 10/2014 | Takizawa et al. |
| 2019/0044405 A1* | 2/2019 | Calebrese ............... H02K 21/16 |
| 2019/0052142 A1* | 2/2019 | Sullivan .................. H02K 3/38 |
| 2022/0006346 A1* | 1/2022 | Zhang ..................... H02K 9/19 |

* cited by examiner

METHOD AND SYSTEM FOR ELECTRICALLY INSULATING PORTIONS OF AN ELECTRIC MACHINE

TECHNICAL FIELD

This disclosure generally relates to electrically insulating portions of an electric machine, specifically a set of windings within a stator core of the electric machine.

BACKGROUND

Electric machines, such as electric motors or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. The electric machine can further drive other portions of the aircraft engine such as a forward fan or a propeller. Regardless of the mode, an electric machine typically includes a stator with windings that works in conjunction with a rotor that also has windings and is driven to rotate by a source of rotation, which for a generator can be a gas turbine engine or for a motor can be the stator.

BRIEF DESCRIPTION

In one aspect, aspects of the disclosure relate to an electric winding assembly, comprising a conductor core having a first end and a distal second end, an insulation layer overlying the conductive core, and a conductive shield layer overlying the insulation layer, and having a terminal end conductively connected with the conductive shield layer, the terminal end extending adjacent one of the first end or the second end.

In another aspect, aspects of the disclosure relate to a stator assembly, comprising a stator core having a set of posts, a set of stator windings wound about at least a subset of the posts, each stator winding having by a conductor core having a first end and a distal second end, an insulation layer overlying the conductor core, and a conductive shield layer overlying the insulation layer, and having a terminal end conductively connected with the conductive shield layer, and a grounding electrical connection between each terminal end of the set of stator windings, defining a common ground.

In another aspect, aspects of this disclosure relate to a method of assembling a stator, the method comprising forming a conductor core, overlying the conductor core with an insulation layer, overlying the insulation layer with a conductive shield layer having a conductively connected terminal end, defining a stator winding, overlying a termination point of between the conductive shield layer and the insulation layer with a semi-conductive layer, winding a set of the stator windings about a set of posts of a stator core, and conductively connecting each terminal end of the set of stator windings to define a common ground.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Aspects of the disclosure can be implemented in any stator assembly or electric machine assembly having a set of stator slots wound with conductive windings. The conductive windings or stator windings can include a conductor core, an insulation layer overlying the conductive core, and a conductive shield layer overlying the insulation layer. For purposes of this description, the stator assembly is described with respect to an electric machine, electric machine assembly, generator, or similar language, which is meant to clarify that one or more stator or rotor combinations can be included in the machine. Non-limiting aspects of an electric machine can include an electric generator, an electric motor, a starter/generator, a transformer, an inductor or the like.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

Electric machines can include a stator assembly with one or more stator windings. Current stator windings, however, can be limited to electrical characteristic thresholds in particular operating environments. For example, windings may be limited in an aircraft generator to particular currents, voltages, or the like, due to operational characteristics at flying altitudes. These limitations can, in turn, limit the effectiveness or efficiency of the electric machines, themselves. In one non-limiting example, typical electric machines may only be limited to 300V or less at sea level or cruise altitude. Electrical characteristic limits of typical electric machines can be designated by adding layers of insulation to the windings to ensure that undesired events, such as a corona discharge, does not occur. While those electrical characteristic limits can be altered for higher voltage and current levels by increasing the thickness of the insulation layers, the overall space within the electric machine for the stator windings is decreased as the thickness of the insulation layers increases. As such, the overall efficiency or power output of the electric machine is decreased.

Figure 1:
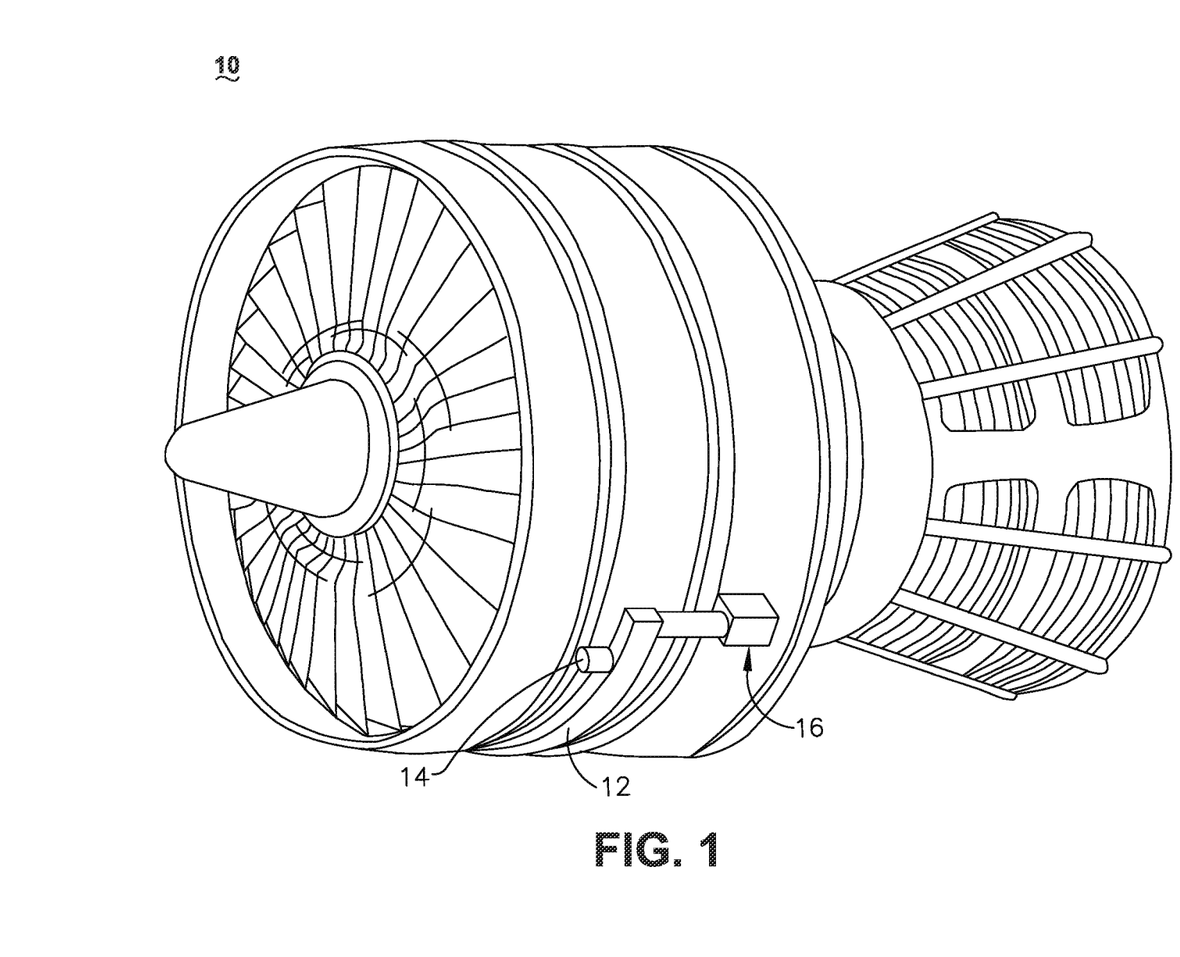
FIG. 1 is an isometric view of a gas turbine engine having a generator, in accordance with various aspects described herein.

FIG. 1 illustrates a gas turbine engine 10 having an accessory gear box (AGB) 12 and an electric machine or generator 14 according to an aspect of the disclosure. The gas turbine engine 10 can be a turbofan engine commonly used in modern commercial aviation. For example, the gas turbine engine 10 could include a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation. For example, the gas turbine engine 10 can be any of a variety of other known gas turbine engines such as a turboprop or turboshaft. The type and specifics of the gas turbine engine 10 are not germane to the disclosure and will not be described further herein. While a generator 14 is shown and described, it will be appreciated that the generator 14, can be any electric machine including, but not limited to, an electric motor or starter/generator.

Figure 2:
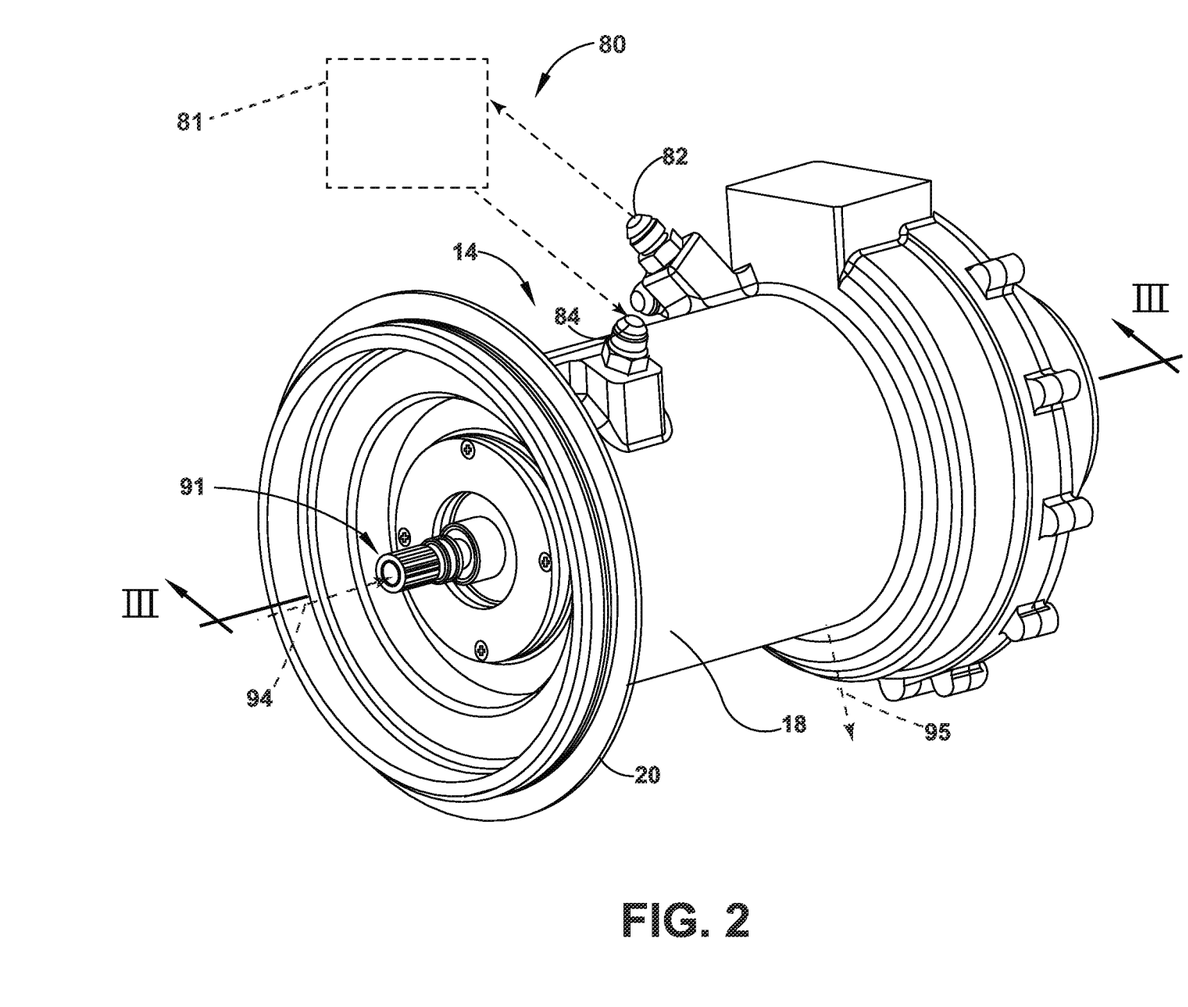
FIG. 2 is an isometric view of an exterior of the generator of FIG. 1, in accordance with various aspects described herein.

FIG. 2 illustrates a non-limiting example generator 14 and its housing 18 in accordance with aspects of the disclosure. The generator 14 can include a clamping interface 20, used to clamp the generator 14 to the AGB (not shown). A set of electrical connections can be provided on the exterior of the generator 14 to provide for the transfer of electrical power to and from the generator 14. The set of electrical connections can be further connected by cables to an electrical power distribution node of an aircraft having the gas turbine engine 10 to power various items on the aircraft, such as lights and seat-back monitors. The generator 14 can include a liquid cooling system 80 for cooling or dissipating heat generated by components of the generator 14 or by components proximate to the generator 14, one non-limiting example of which can be the gas turbine engine 10. For example, the generator 14 can include a liquid cooling system 80 using oil as a coolant The liquid cooling system 80 can include a cooling fluid inlet port 82 and a cooling fluid outlet port 84 for controlling the supply of coolant to the generator 14. In one non-limiting example, the cooling fluid inlet and outlet ports 82, 84 can be utilized for cooling at least a portion of a rotor or stator of the generator 14. The liquid cooling system can also include a second coolant outlet port 91, shown at a rotatable shaft or a drive shaft portion of the generator 14. Optionally, by way of non-limiting example, the liquid cooling system 80 can include a drive shaft coolant inlet port 94 or a generator coolant outlet port 95. While not shown, aspects of the disclosure can further include other liquid cooling system 80 components, such as a liquid coolant reservoir or a coolant source 81 fluidly coupled with the cooling fluid inlet port 82, the drive shaft coolant inlet port 94, the cooling fluid outlet port 84, or the generator coolant outlet port 95, and a liquid coolant pump to forcibly supply the coolant through the ports 82, 84, 94, 95 or generator 14. As such, the liquid cooling system 80 and its respective components can constitute a fluid system with a set of fluid passages coupled to the coolant source 81.

Figure 3:
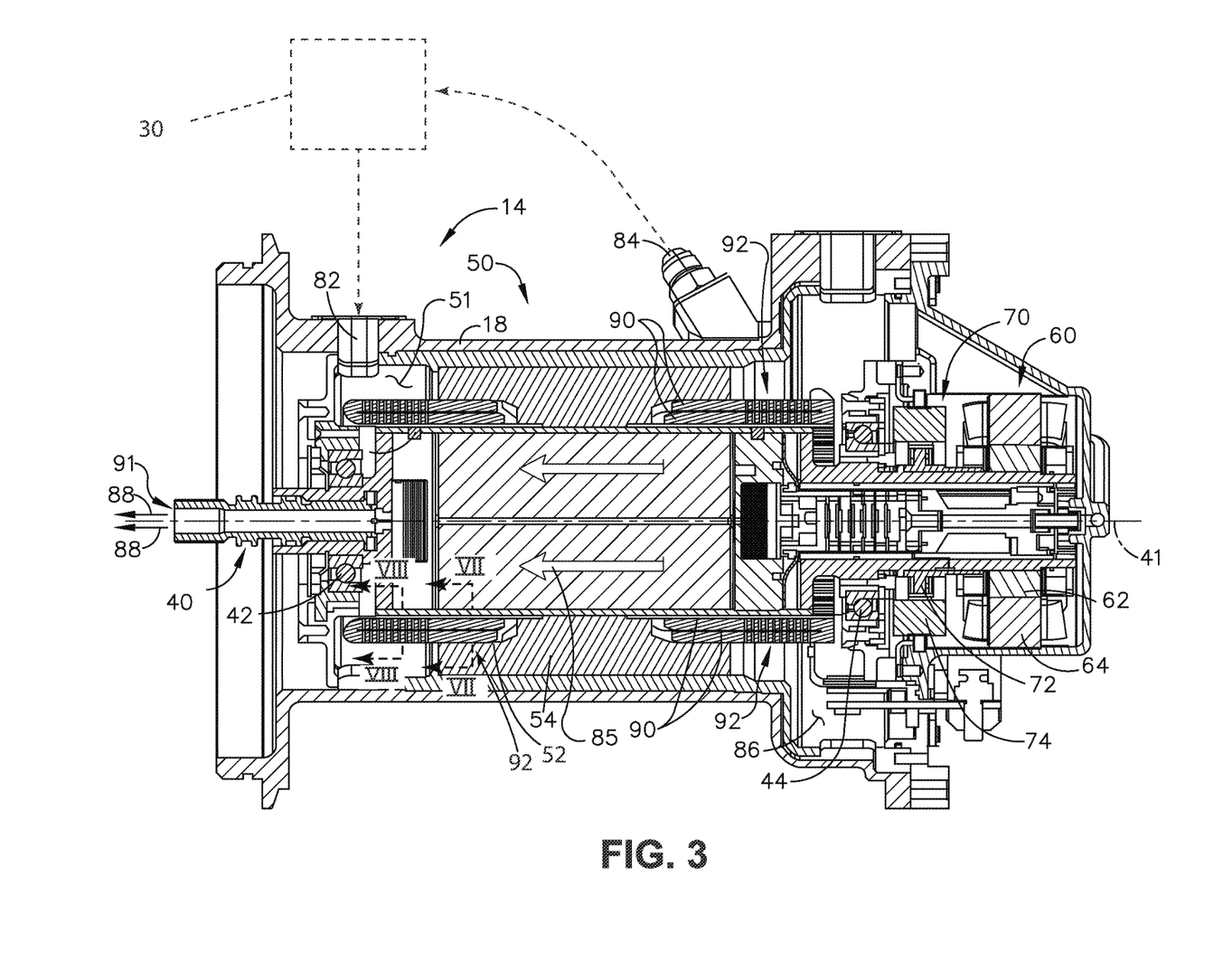
FIG. 3 is a schematic cross-sectional view of the generator of FIG. 2, taken along line of FIG. 2, in accordance with various aspects described herein.

A non-limiting interior of the generator 14 is best seen in FIG. 3, which is a cross-sectional view of the generator 14 shown in FIG. 2 taken along line A drive shaft 40 is located within the generator 14 and is the primary structure for supporting a variety of components. The drive shaft 40 can have a single diameter or one that can vary along its length. The drive shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the drive shaft 40. Examples of these elements can include a main machine 50 or electric machine, housed within a main machine cavity 51, an exciter 60, and a permanent magnet generator (PMG) 70. It will be appreciated that the electric machine can specifically be a Pulse-Width Modulation (PWM) driven electric machine, or any other suitable electric machine such as, but not limited to, a 50/60 Hz sine wave machine. The corresponding rotating component comprises a main machine rotor 52, an exciter rotor 62, and a PMG rotor 72, respectively, and the corresponding fixed component comprises a main machine stator assembly 54 or stator assembly, an exciter stator 64, and a PMG stator 74. In this manner, the main machine rotor 52, exciter rotor 62, and PMG rotor 72 are disposed on and co-rotate with the drive shaft 40. The fixed components can be mounted to any suitable part of the housing 18, and include the main machine stator assembly 54, exciter stator 64, and PMG stator 74. Collectively, the fixed components define an interior through which the drive shaft 40 extends and rotates relative to.

It will be understood that the main machine rotor 52, exciter rotor 62, and PMG rotor 72 can have a set of rotor poles, and that the main machine stator assembly 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn 92 or end winding. Aspects of the disclosure shown include at least one set of stator windings 90 arranged longitudinally along the housing 18, that is, in parallel with housing 18 and the rotational axis 41. The set of stator windings 90 can also include a set of end turns 92 extending axially beyond opposing ends of a longitudinal length of a main machine stator assembly 54. Each of the stator windings 90 can comprise a thermally conductive and electrically conductive material including, but not limited to, copper.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same drive shaft such as the liquid coolant pump, a fluid compressor, or a hydraulic pump.

As explained above, the generator 14 can be oil cooled and thus can include the liquid cooling system 80 fluidly coupled to the coolant source 81. The coolant from the coolant source 81 such as the cooling oil can be used to dissipate heat generated by the electrical and mechanical functions of the generator 14. The liquid cooling system 80 using oil can also provide for lubrication of the generator 14. In the illustrated aspects, the generator 14 can be a liquid cooled, liquid cooling system 80 including the cooling fluid inlet port 82 and the cooling fluid outlet port 84 for controlling the supply of the cooling fluid to the liquid cooling system 80. The liquid cooling system 80 can further include, for example, a cooling fluid reservoir 86 and various cooling passages. The drive shaft 40 can provide one or more channels or paths for coolant or fluid coolant flow 85 (shown schematically as arrows) for the main machine rotor 52, exciter rotor 62, and PMG rotor 72, as well as a rotor shaft cooling fluid outlet 88, such as the second coolant outlet port 91, wherein residual, unused, or unspent oil can be discharged from the drive shaft 40.

In non-limiting examples of the generator 14, the fluid coolant flow 85 can further be directed, exposed, sprayed, or otherwise deposited onto the set of stator windings 90, the set of end turns 92, or onto alternative or additional components. In this example, the fluid coolant flow 85 can flow from the drive shaft 40 radially outward toward the set of stator windings 90 or the set of end turns 92. In this sense, the coolant can cool the respective set of stator windings 90 or set of end turns 92 via the set of fluid passages coupled to the cooling fluid reservoir defined as the coolant source 81.

Figure 4:
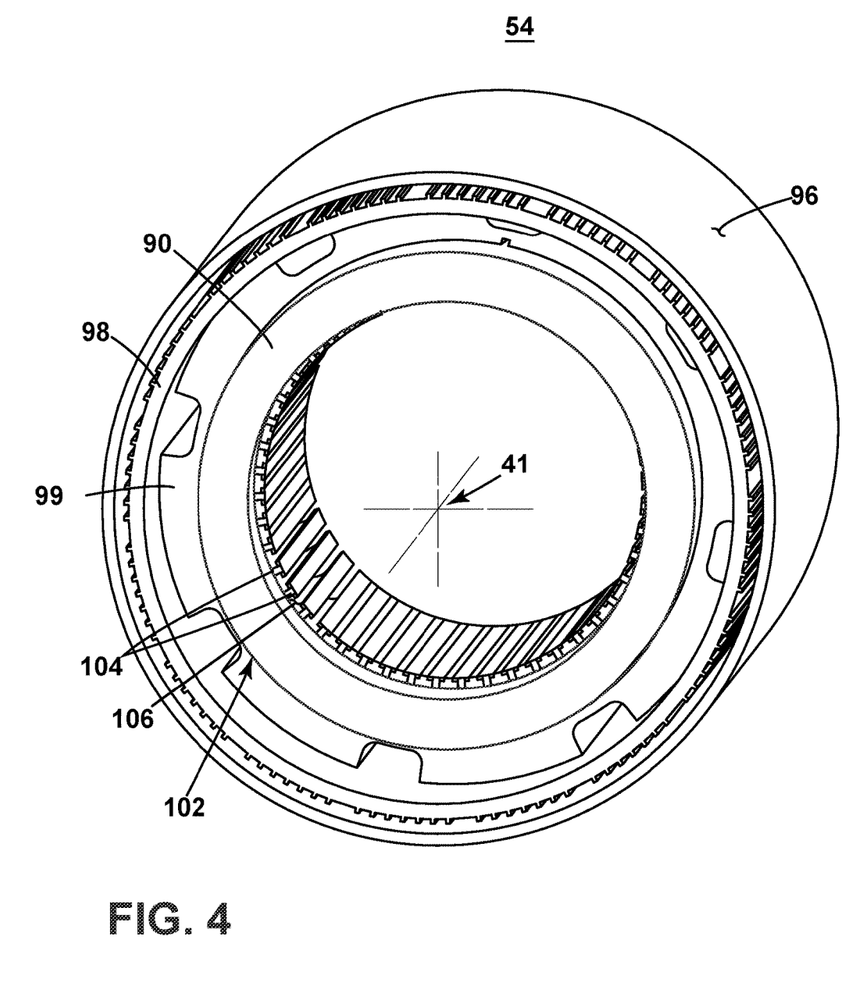
FIG. 4 is an isometric view of a stator assembly of the generator of FIG. 3, in accordance with various aspects described herein.

FIG. 4 further illustrates the main machine stator assembly 54 for the main machine of the generator 14 of FIG. 3. While the main machine stator assembly 54 is shown and described, aspects of the disclosure can be applicable or utilized for any stator assembly of an electric machine, including, but not limited to the exciter stator 64, the PMG stator 74, or the like. In one non-limiting configuration, the main machine stator assembly 54 can include, in a radially arranged relationship, an outer stator case 96, a stator frame 98, a stator support 76, and a stator core 78. As shown, each of the aforementioned components can be radially arranged about the rotational axis 41 extending in an axial direction relative to the main machine stator assembly 54. As shown, the stator core 102 can include a generally cylindrical form received radially within the stator support 99, also having a generally cylindrical form. The stator support 99 is further radially received within the stator frame 98, also having a generally cylindrical form. The stator frame 98 can further be radially received within the outer stator case 96 having a generally cylindrical form. It will be appreciated that the stator support 99 and the stator frame 98 can be received within the stator frame 98 and the outer casing 96, respectively, through press fitting.

The stator core 102 can further include a set of posts or teeth 104 extending from the stator core 102 radially inward toward the rotational axis 41. The set of teeth 104 can further define a set of slots 106, such as openings, gaps, spaces, or the like, between adjacent teeth 104. At least a subset of the slots 106 can be wound with a conductive wire or set of conductive wires to form the set of stator windings 90 schematically illustrated in FIG. 4. In one non-limiting example, each of the slots 106 of the set of slots 106 can include or otherwise receive at least one stator winding 90.

Figure 5:
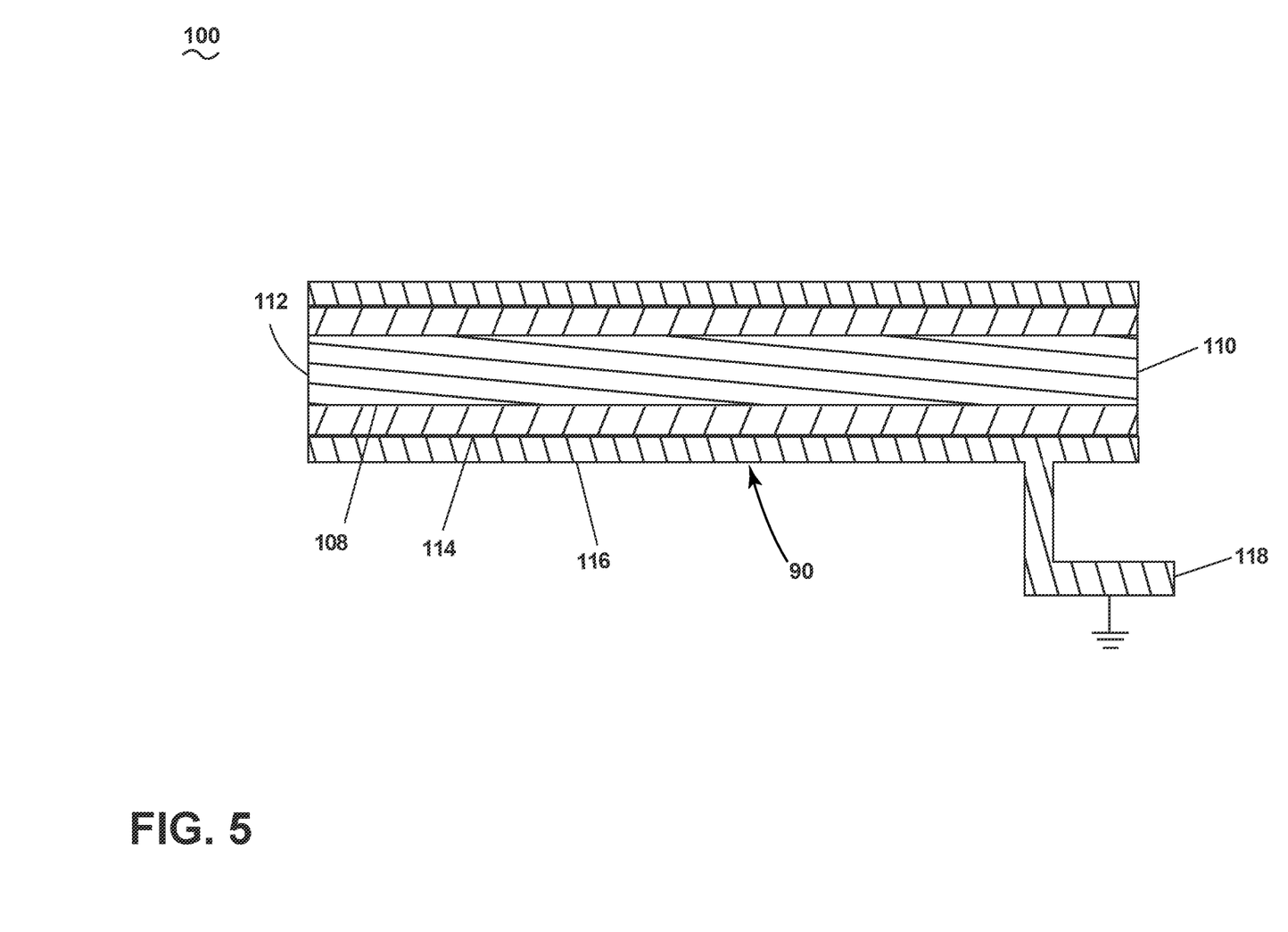
FIG. 5 is a schematic cross-sectional view of an electric winding assembly of the generator of FIG. 3, in accordance with various aspects as described herein.

FIG. 5 is a schematic cross-sectional view of an electric winding assembly 100, such as a stator winding 90 of FIG. 3. The stator winding 90 can be one of a set of stator windings 90, or can collectively comprise the set of stator windings 90.

The electric winding assembly 100, specifically the stator winding 90, can include a conductor core 108 including a first end 110 and a distal second end 112. The conductor core 108 can be surrounded by an insulation layer 114 that can be further surrounded by a conductive shield layer 116. The insulation layer 114 can include any suitable insulating material placed around the conductor core 108 including, but not limited to, mica insulation or tape, polymer film, composite insulation, or the like. It is further contemplated that the insulation layer 114 can be impregnated or supported by other materials such as, but not limited to, an epoxy resin or a fiberglass weave. The conductive shield layer 116 can include any known conductive coating, conductive paint, or conductive tape suitable for the operating parameters of the electric machine including materials such as, but not limited to, nickel coated polymers, copper coated polymers, fiberglass, or any other combination thereof. Both the insulation layer 114 and the conductive shield layer 116 can include a set of insulation layers 114 or a set of conductive shield layers 116, respectively. For example, the conductive shield layer 116 can include a Silicone Carbide (SiC) tape that can be wrapped around itself two or more times such that the conductive shield layer 116 is any number of two or more conductive shield layers 116 radially stacked on one-another from the conductor core 108, thus forming the set of conductive shield layers 116. Specifically, it is contemplated that the conductive shield layer 116 can be wrapped around itself a number of times such that the total thickness of the conductive shield layer 116 is greater than 50% of the thickness of the conductor core 108. It is further contemplated that the insulation layer 114 and the conductive shield layers 116 can be non-uniform along the conductor core 108. For example, the thickness of the insulation layer 114 at the end the first end 110 can be larger than the thickness of the insulation layer 114 at the second end 112. This can be used in cases where an increase in the thickness of layers, such as an increased thickness in the insulation layer 114 to provide for additional insulation is preferred or required at various locations along the electric winding assembly 100.

As illustrated, a terminal end 118 can be provided adjacent the first end 110 of the conductor core 108. It will be appreciated, however, that the terminal end 118 can be provided adjacent one of either the first end 110 or the distal second end 112. The terminal end 118 can be electrically coupled to a portion of the electric winding assembly 100 and be configured to act a ground of the electric machine. Specifically, the terminal end 118 can be electrically coupled to a portion of the conductive shield layer 116 received within the slot 106. The ground can be, for example, a portion of a stator assembly 54, specifically a stator core 102. Alternatively, the ground can be any other suitable ground exterior the stator assembly 54 or the electric machine, or a common ground defined by a collective electrical connection to other terminal ends 118 of the set of winding assemblies 100. As such, the terminal end 118 can be defined as a portion of the electric winding assembly 100 conductively connected to a common ground. It will be appreciated that although no turns in the electric winding assembly 100 are illustrated in FIG. 5, the electric winding assembly 100 can further include a set of end turns between the first end 110 and the second end 112.

Figure 6:
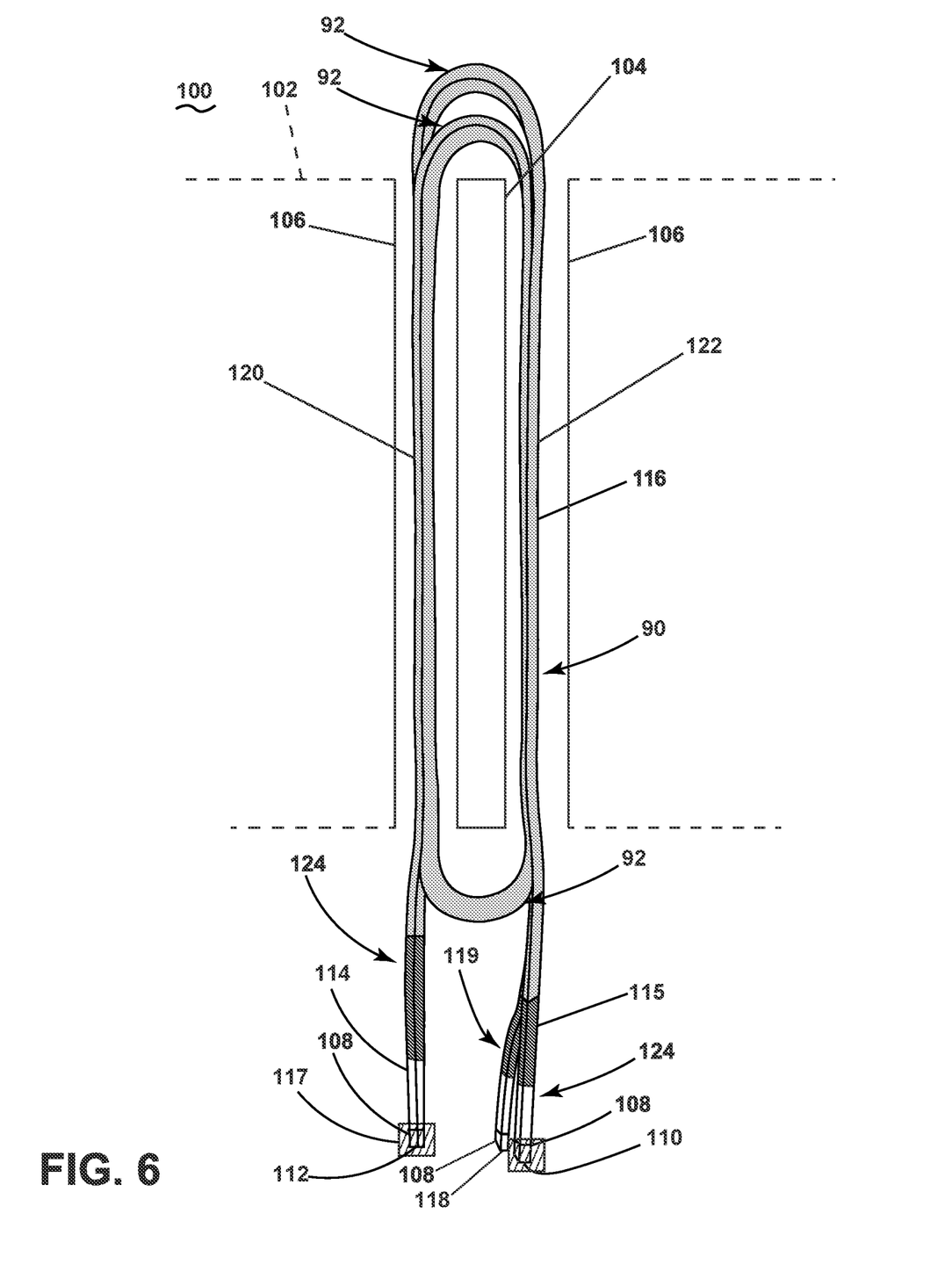
FIG. 6 is a perspective view of the electric winding assembly of FIG. 5, in accordance with various aspects as described herein.

FIG. 6 illustrates a perspective view of a section of the electric winding assembly 100 of FIG. 5 received within the stator core 102 of FIG. 4. As illustrated, each stator winding 90 of the set of stator windings 90 can be received within corresponding slots 106 of the set of slots 106. The stator winding 90 can include a first leg 120 received within a first slot of the set of slots 106 and a second leg 122 received within a second slot 106 slot 106 of the set of slots 106. The first and second slots 106 can be adjacent one another. Alternatively, the first and second slots 106 can be circumferentially spaced from one another with one or more slots 106 of the set of slots 106 located between the first and second slots 106. The first leg 120 and the second leg 122 can be separated by a corresponding tooth 104 of a set of teeth 104. In the non-limiting illustrated example, the stator winding 90 can include three end turns 92 provided axially outward from the set of slots 106 or axially beyond the stator core 102. It will be appreciated that there can be any number of end turns 92. As illustrated, the end turns 92 can be axially spaced from one another at a corresponding end of the stator core 102.

The electric winding assembly 100 can further include a set of leads 124 at the corresponding first end 110 or the second end 112. The set of leads 124 can be defined as a portion of the electric winding assembly 100 which terminate in a free end at either the first or second ends 110, 112 or the terminal end 118. The terminal end 118 can be electrically coupled to a terminal end lead 119 which can extend along a portion of the second leg 122 and terminate within the slot 106. As shown, non-limiting examples of the electric winding assembly 100 can be included where the set of leads 124 are located or co-located on a same or common axial end of the of the stator core 102. The set of leads 124 can be further defined as a portion of the electric winding assembly 100 without the conductive shield layer 116. The set of leads 124 can include at least a portion of the leads with the conductor core 108 without the insulation layer 114. The set of leads 124 can be electrically coupled with one or more leads of adjacent electric winding assemblies 100 (e.g., the set of leads 124 terminating in the first or second end 110, 112) or the common ground (e.g., the lead 124 terminating in the terminal end 118).

A semi-conductive layer 115 can be included along a portion of the leads 124 closes to the conductive shield layer 116 and extend along a portion of the leads 124. The semi-conductive layer 115 can be in the form of a tape or a paint applied around the periphery of the insulation layer 114 of the leads 124. The semi-conductive layer 115 can be configured to further reduce the amount of partial discharge from the electric winding assembly 100 at the leads 124. The semi-conductive layer 115 can include a tape, a coating or a paint of any suitable material such as, but not limited to Silicon Carbide (SiC), or the like.

It is contemplated that a portion of the semi-conductive layer 115 can overlay or cover a portion of the conductive shield layer 116 such that a termination point of the conductive shield layer 116 occurs underneath the semi-conductive layer 115. As such, a portion of the semi-conductive layer 115 can extend into the slot 106. Additionally, or alternatively, a layer of high-permittivity insulation (not shown) could be applied over the termination point of the conductive shield layer 116. The semi-conductive layer 115 or the high-permittivity insulation can be further defined as a stress grading system.

A set of caps 117 can be included around at least a portion of the electric winding assembly 100. Specifically, each cap 117 can be provided around the conductor cores 108 near the first and second ends 110, 112 of the set of leads 124. The set of caps 117 can include any suitable material being able to be bonded to copper and include material properties such as, but not limited to, high dielectric properties, a low coefficient of thermal expansion, and a high mechanical strength. For example, suitable materials can include any materials such as, but not limited to, epoxy, silicone, or the like. It is contemplated that the stator core 102 can include a set of electric winding assemblies 100 each being received within a respective slot of the set of slots 106. The set of caps 117 can be configured to receive or hold one or more sets of leads 124 such that one lead 124 of the electric winding assembly 100 can be received within the cap 117 and come into electrical contact with another lead 124 from an adjacent electric winding assembly 100. As such, the set of caps 117 can electrically connect adjacent winding assemblies 100.

It will be appreciated that the thickness of the insulation layer 114 and the conductive shield layer 116 can vary along the entirety of the electric winding assembly 100. For example, the insulation layer 114 can include be thicker (e.g., include a larger thickness, thus providing additional insulative properties, comparatively) at the end turns 92 than it is along the stator winding 90 within the slots 106. Specifically, the stator winding 90 within the slot 106 can be defined by an axial length in a direction along a central stator axis. The thickness of the insulation layer 114 at the end turn 92 can be larger than the axial length of the stator winding 90. This variation in the insulation layer between the stator winding 90 and the end turns 92 can allow for an increased insulation along the electric winding assembly 100.

In operation, the electric winding assembly 100, specifically the stator windings 90 and the end turns 92 of the electric machine can experience high voltages based on performance parameters or environmental conditions. As used herein, performance parameters can refer to the parameters of the operation of the electric machine including, but not limited to, the operating voltage of the electric machine. Environmental conditions can refer to external conditions of the electric machine including, but not limited to, an altitude, an air pressure, an ambient air temperature, or a combination thereof. In conventional electric machines without the electric winding assembly 100 as described herein, the performance parameters or environmental conditions, in turn, produce undesirable arc conditions or a partial discharge. As used herein, the terms "arc," "arcing," "electrical arc," "arcing event," or "arc fault" will refer to an unintended or undesired conduction of electric current across a traditionally non-conductive medium, such as air. As used herein, the term "partial discharge" can refer to any electrical discharge through the fluid (e.g., air) surrounding the electric winding assembly 100. Specifically, the term "partial discharge" can refer to any surface partial discharge in the form of a corona discharge. Partial discharges can be defined as a discharge which does not cause an arcing condition, however, breaks down various insulating layers of the electric winding assembly. This, in turn, can place the electric winding assembly at higher risk for arcing conditions to occur over time through the degradation of the insulating layers. Environmental conditions and performance parameters such as, for example, altitude and operating voltages, respectively, can increase the likelihood for an arc fault to occur. The electric machine as described herein can operate at a high voltage while the aircraft is at a high altitude when compared to traditional electric machines or aircrafts including the traditional electric machines. The electric machine as described herein can operate at high voltage, high altitude conditions because of the electric winding assembly 100 that can prevent partial discharge from the set of stator windings 90. Specifically, the insulation layer 114 and the conductive shield layer 116 can prevent the partial discharges from occurring, or can reduce the likelihood of partial discharges from occurring, for example, in the environmental conditions or performance parameters discussed herein. The insulation layer 114 can further provide phase separation between adjacent stator windings 90. The conductive shield layer 116 can block any partial discharge created by the conductor core 108 from entering the medium external the electric winding assembly 100. This can be done as the conductive shield layer 116 can act as a Faraday Cage or a Faraday Shield which is ultimately grounded to the common ground through the terminal end 118. As such, the partial discharge is prevented from entering the medium exterior the electric winding assembly 100. The semi-conductive layer 115 can be included over a portion of the electric winding assembly 100. Specifically, the semi-conductive layer 115 can be provided over the termination of the conductive shield layer 116. As a non-limiting example, a local electric field can occur at the termination of the conductive shield layer 116. This local electric field can, in turn, be projected outward, and away from the termination of the conductive shield layer 116. The semi-conductive layer 115 can be configured to control or suppress the local electric field at the termination of the conductive shield layer 116 to ensure that it does not cause a surface partial discharge. It is further contemplated that the addition of the high-permittivity insulation can also further limit or control the local electric field. As used herein, the phrase stress grading system can refer to any material or layer (e.g., the semi-conductive layer 115) which can be included to control or reduce the local electric field.

Although described in terms of electric winding assembly 100, it will be appreciated that other aspects (e.g., a method of cooling the electric winding assembly 100) as described herein can be included in the electric winding assembly 100 to further ensure the prevention of partial discharge under the performance parameters of the electric machine or the environmental conditions of the aircraft as described herein.

Figure 7:
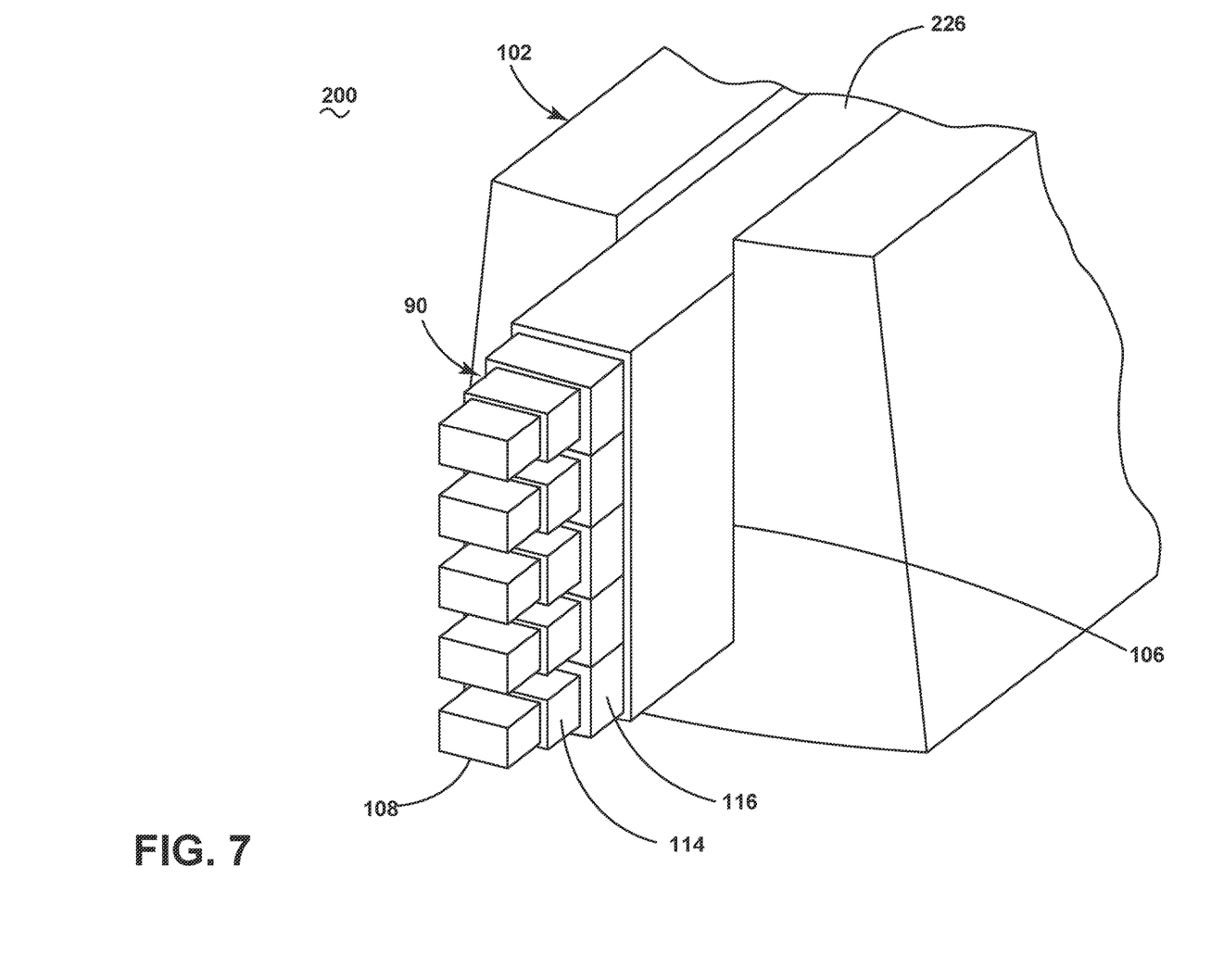
FIG. 7 is a schematic cross-section view of the stator core of FIG. 3, taken along line VII-VII of FIG. 3 in accordance with various aspects as described herein.

FIG. 7 is a schematic cross-sectional view of an electric winding assembly 200, such as the set of stator windings 90 taken from VII-VII of FIG. 3. The electric winding assembly 200 is similar to the electric winding assembly 100 therefore, like parts will be identified with like numerals increased to the 200 series, with it being understood that the description of the like parts of the electric winding assembly 100 applies to the electric winding assembly 200 unless otherwise noted. As illustrated, the electric winding assembly 200 can include a bundle of conductor cores 108 surrounded by various layers as described herein. As used herein, the term "bundle" can refer to a grouping or cluster of elements, specifically the conductor core 108 surrounded by various layers as described herein. As illustrated, the electric winding assembly 200 can include five stator windings 90 each including a corresponding conductor core 108 formed within the bundle. Although illustrated as a singular bundle received within the slot 106, it is contemplated that there can be any number of one or more bundles received within the slot 106 each of the same or differing phases and including any number of one or more conductor cores.

For illustrative purposes only, the electric winding assembly 200 is shown as a telescopic assembly by peeling away or omitting subsequent layers of the electric winding assembly 200. As such, any portion of the electric winding assembly 200 (specifically the stator winding 90) can include the conductive shield layer 116, and the insulation layer 114 surrounding the conductor core 108.

The electric winding assembly 200 can include the set of conductive shield layers 116 around a corresponding conductor core 108. The conductor cores 108, and hence the conductive shield layers 116, can be radially stacked within the slot 106 such that at least a portion of an outer surface of the conductive shield layers 116 of adjacent conductor cores 108 can be in electrically conductive contact.

A wrapping or an additional conductive shield layer 226 can be formed around the periphery of the conductive shield layer 116. It is contemplated that the additional conductive shield layer 226 can be formed around the entire bundle such that it inscribes all of the conductor cores 108 within the bundle. Specifically, the additional conductive shield layer 226 can be formed around the periphery of the set of conductive shield layers 116. It is contemplated that the additional conductive shield layer 226 can be included as a portion of the conductive shield layer 116. In other words, the additional conductive shield layer 226 can include the same material as the conductive shield layer 116 such that it includes the same electrically conductive properties as the conductive shield layer.

As a non-limiting example, the additional conductive shield layer 226 can be included in instances where additional shielding or protection of the electric winding assembly 200 is required or preferred. For example, the additional conductive shield layer 226 can provide for additional conductive shielding for the electric winding assembly 200. The additional conductive shield layer 226 can be included in cases or specific areas of the electric winding assembly where increased conductive shielding can be required (e.g., based on operating voltage, altitude of the aircraft, etc.).

As illustrated, the electric winding assembly 200 includes five radially stacked stator windings 90. The stator windings 90 can be fully inscribed within the additional conductive shield layer 226 to form the bundle. It will be appreciated, however, that there can be any number of stator windings 90 and bundles received within the corresponding slot 106. Additionally, or alternatively, the stator windings 90 can be received within the corresponding slot 106 in a non-radial manner such as, for example, circumferentially within the slot 106. It is further contemplated that one or more the stator windings 90, or one or more of the bundles, within a single slot 106 can be of a single electrical phase, or different sets or groupings of stator windings 90 within a single slot 106 can be of different electrical phases. For example, in terms of the stator windings 90, there can be stator windings 90 having two or three different electrical phases within a single slot 106. It is further contemplated that the additional conductive shield layer 226 can form a set of wrappings which can separate or group the windings defining the one or more electrical phases within each slot 106. For example, one additional conductive shield layer 226 of the set of wrappings can fully encase three of the stator windings 90 of a first phase to form a first bundle, while a second additional conductive shield layer 226 of the set of wrappings can fully encase the remaining two stator windings 90 of a second phase to form a second bundle, different than the first phase. Alternatively, it is contemplated that the additional conductive shield layer 226 can be omitted from the electric winding assembly 200. In such cases, the conductive shield layer 116 can form the periphery of the electric winding assembly 300 and abut directly against the slot 106.

Figure 8:
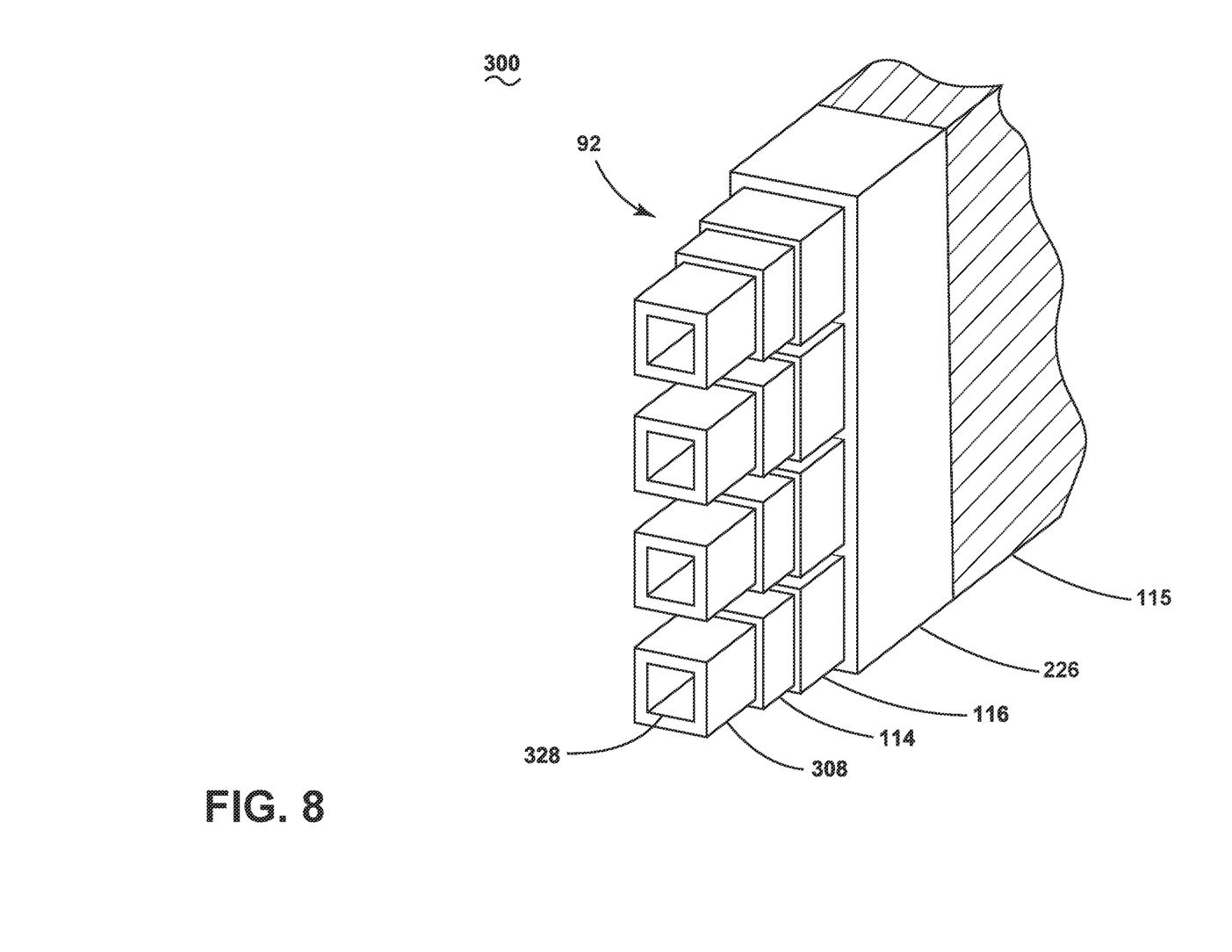
FIG. 8 is a schematic cross-section view the generator of FIG. 3, taken along line VIII-VIII of FIG. 3 in accordance with various aspects as described herein.

FIG. 8 is a schematic cross-sectional view of an electric winding assembly 300, specifically the set of end turns 92 similar to the set of end turns 92 shown in FIG. 3, and in a view shown as VIII-VIII of FIG. 3. The electric winding assembly 300 is similar to the electric winding assembly 100, 200, therefore, like parts will be identified with like numerals increased to the 300 series, with it being understood that the description of the like parts of the electric winding assembly 100, 200 applies to the electric winding assembly 300 unless otherwise noted. As illustrated, the electric winding assembly 300 can include a conductor core 308 surrounded by various layers as described herein.

The set of electric winding assembly 300 can include a fluid passage 328 formed within the interior of the conductor core 308, and can extend through the entire length of the electric winding assembly 300 The fluid passage 328 can be fluidly coupled to the liquid cooling system 80 such that coolant form the coolant source 81 can flow through the interior of the conductor core 308 to cool, or remove heat generated in, at least a portion of the conductor core 308. It will be further appreciated that any number of the set of stator windings 90, or end turns 92 can include a corresponding fluid passage 328.

For illustrative purposes only, the electric winding assembly 300 is shown as a telescopic assembly by peeling away or omitting subsequent layers of the electric winding assembly 300. As such, any portion of the electric winding assembly 300 (specifically the stator end turn 92) can include the fluid passage 328, the conductive shield layer 116, and the insulation layer 114 surrounding the conductor core 308.

Figure 9:
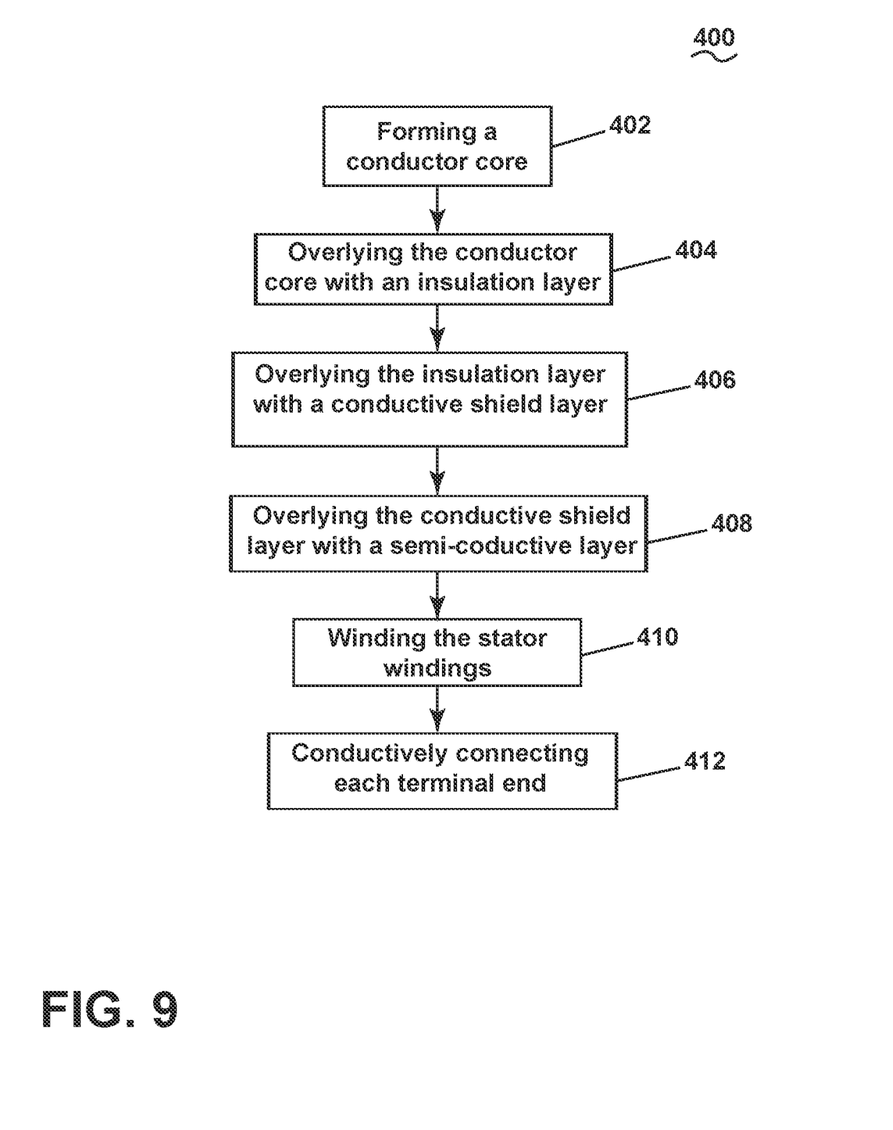
FIG. 9 is a method of forming the stator core of FIG. 3, in accordance with various aspects as described herein.

FIG. 9 is a non-limiting example method 400 of forming the stator core 102 of FIG. 3, as described herein. Although described in terms of the electric winding assembly 100, 200, 300, it will be appreciated that the methods described can be applied to any of the electric winding assemblies 100, 200, 300 or combination thereof, as described herein.

The method 400 can begin with forming the conductor core 108, 308 at step 402. The conductor core 108, 308 can be formed through any suitable manufacturing method and include any suitable conductive material, such as, but not limited to, Copper. The conductor core 108, 308 can then be overlaid with the insulation layer 114, at step 404. The insulation layer 114 can be overlaid with the conductive shield layer 116, at step 406. The semi-conductive layer 115 can be overlaid with a portion of the conductive shield layer 116, at step 408. Specifically, the semi-conductive layer 115 can be overlaid with the termination point of the conductive shield layer 116. As the conductive shield layer 116 and the semi-conductive layer 115 can include a tape, a coating, or a paint, the conductive shield layer 116 and the semi-conductive layer 115 can be applied around the insulation layer 114 and the conducive shield layer 116, respectively, multiple times. The tape, coating, or paint can further be applied on top of or around itself multiple times to form the set of conductive shield layers 116 or a set of semi-conductive layers 115. The stator windings 90 of the electric winding assembly 100, 200, 300 can then be wound through respective slots 106 and around a corresponding tooth 104 of the stator core 102, at step 410. The set of terminal ends 118 can be conductively connected to at least a portion of the stator core 102 or the electric machine to form a common ground, at step 412.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method. For example, the method 400 can include various other steps. In one non-limiting example, the end turns 92 can be overlaid with the insulation layer 114 such that the insulation layer 114 of the end turn 92 has a greater thickness than the axial length of the conductor core through the slot 106. Further, a subset of the stator windings 90 can be grouped within during step 410 such that the subset of stator windings 90 can have a common conductive phase and be overlaid with a second conductive shield layer 116 to group the subset of stator windings by phase. In another non-limiting example, a subset of conductor cores 108, 308 can be overlaid with a respective subset of insulation layers 114 at step 404. The subset of insulation layers 114 can additionally or alternatively be overlaid with a singular conductive shield layer 116 at step 406 in order to define a single-phase grouping of conductor cores 108, 308. The method 400 can further include the steps of forming the conductor core with a fluid passage 328 before winding them through the slots 182 at step 410 and ultimately fluidly coupling the fluid passage 328 to the coolant source 81.

It is contemplated that aspects of this disclosure can be advantageous for use over conventional electric winding assemblies. Advantages include that the electric winding assembly as described herein can allow for a high-voltage, high-altitude system, or a compact system to operate without the threat of undesirable partial discharges. Conventional electric winding assemblies for power generation or power distribution, for example, are rated for voltages of up to 300V at a cruise altitude or sea level. If they operate at a higher altitude, the risk of a partial discharge is increased as the medium surrounding the electric winding assembly thins and trends towards being a vacuum. The electric winding assembly, as described herein, can prevent or reduce partial discharge through the medium exterior the electric winding assembly at cruise altitudes, high altitudes, in high-voltage systems, compact systems, or any combination thereof. Although described in terms of a high-voltage, high-altitude system, it will be appreciated that the electric winding assemblies, as described herein, can include the set of stator windings to prevent partial discharge or surface from the set of windings at cruise altitude atmospheric conditions of an aircraft.

Further advantages of the electric winding assembly include a higher power density for the electric machine. Convectional electric winding assemblies primarily use multiple or thick insulation layers and large spacing between windings in different phase groups in order to prevent partial discharge from occurring. This has been found to be reliable for electric machines operating at the rated voltages at cruise altitude. However, the conventional electric winding assemblies are not suitable for use with high-voltage or high-altitude systems without having to first apply additional insulation layers to the electric winding assembly or to space adjacent windings of different phase groups further from each other. This, in turn, requires a larger electric machine in order to achieve desired operating parameters in high-voltage or high-altitude systems. In systems where there is a size constraint, such as in compact systems, this might not be possible as there may not be enough room available for an electric machine including the conventional electric winding assembly with increased thickness of the insulation layers or spacings between adjacent windings of different phases. The electric winding assembly as described herein, however, utilizes additional layers (e.g., the conductive shield layer and the semi-conductive layer) to prevent partial discharge with high-voltage or high-altitude systems. When compared to the conventional electric winding assemblies, the overall thickness of that layers of the electric winding assembly described herein needed to prevent partial discharge is much smaller than the overall thickness of the insulation layers and space requirements needed to do the same thing with the conventional electric winding assembly. As such, the electric winding assembly as described herein allows for more windings to be included within the electric winding assembly, therefore, increasing the power density of the electric winding assembly.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An electric winding assembly, comprising a conductor core having a first end and a distal second end, an insulation layer overlying the conductive core, and a conductive shield layer overlying the insulation layer, and having a terminal end conductively connected with the conductive shield layer, the terminal end extending adjacent one of the first end or the second end.

The electric winding assembly of any preceding clause wherein the conductive shield layer prevents a partial discharge from the conductor core from emitting exteriorly the conductive shield layer.

The electric winding assembly of any preceding clause wherein the partial discharge is a surface partial discharge.

The electric winding assembly of any preceding clause wherein a thickness of the insulation layer is non-uniform along the conductor core.

The electric winding assembly of any preceding clause wherein the electric winding assembly defines an axial length between the first end and the second end of the conductor core and an end turn portion of the conductor core, and wherein the insulation layer along a portion of the end turn portion is thicker than the insulation layer along a portion of the axial length of the conductor core.

The electric winding assembly of any preceding clause, wherein the conductive shield layer is a conductive paint.

The electric winding assembly of any preceding clause, wherein a semi-conductive layer is provided over a termination point between the conductive shield layer and the insulation layer.

A stator assembly, comprising a stator core having a set of posts, a set of stator windings wound about at least a subset of the posts, each stator winding having by a conductor core having a first end and a distal second end, an insulation layer overlying the conductor core, and a conductive shield layer overlying the insulation layer, and having a terminal end conductively connected with the conductive shield layer, and a grounding electrical connection between each terminal end of the set of stator windings, defining a common ground.

An electric machine comprising the stator assembly of any preceding clause, and wherein the set of stator windings prevents partial discharge from the set of stator windings at cruise altitude atmospheric conditions of an aircraft.

The stator assembly of claim 8 wherein each stator winding defines an axial length of the stator winding positioned between an adjacent subset of the posts, and an end turn length of each stator winding extending axially beyond the stator core includes an insulation layer with a thickness greater than the axial length.

The stator assembly of claim 8 wherein a semi-conductive layer is provided over a termination point between the conductive shield layer and the insulation layer.

A method of assembling a stator, the method comprising forming a conductor core, overlying the conductor core with an insulation layer, overlying the insulation layer with a conductive shield layer having a conductively connected terminal end, defining a stator winding, overlying a termination point of between the conductive shield layer and the insulation layer with a semi-conductive layer, winding a set of the stator windings about a set of posts of a stator core, and conductively connecting each terminal end of the set of stator windings to define a common ground.

The method of any preceding clause wherein the stator winding defines an axial length of the stator winding positioned between an adjacent subset of the posts, and an end turn length of the stator winding extending axially beyond the stator core, and wherein the method further comprises overlaying the end turn length of the conductor core with a greater thickness of insulation layer, compared with the thickness of insulation layer of axial length of the stator winding.

The method of any preceding clause, further comprising grouping a subset of stator windings of a common conductive phase and overlying the grouping with a second conductive shield layer.

The method of any preceding clause, further comprising winding the grouping about a common subset of posts.

The method of any preceding clause, further comprising grouping a subset of conductor cores overlain with respective subset of insulation layers, and wherein the overlying the insulation layer further includes overlying the subset of insulation layers with the conductive shield layer, defining a phase winding.

The method of any preceding clause wherein winding the set of stator windings includes winding the phase winding about the set of posts.

The method of any preceding clause wherein forming the conductor core further comprising forming a fluid passage through the conductor core.

The method of any preceding clause further comprising fluidly coupling the fluid passage with a coolant source.

The method of any preceding clause conductively connecting each terminal end includes conductively connecting each terminal end to the stator core.

What is claimed is:

1. An electric winding assembly, comprising:
   a conductor core having a first end and a distal second end;
   an insulation layer overlying the conductive core;
   a conductive shield layer overlying the insulation layer, and having a terminal end conductively connected with the conductive shield layer, the terminal end extending adjacent one of the first end or the second end, the conductive shield layer having a first conductivity; and
   a semi-conductive layer provided over at least a portion of the conductive shield layer, the semi-conductive layer having a second conductivity less than the first conductivity.

2. The electric winding assembly of claim 1, wherein the conductive shield layer prevents a partial discharge from the conductor core from emitting exteriorly the conductive shield layer.

3. The electric winding assembly of claim 2 wherein the partial discharge is a surface partial discharge.

4. The electric winding assembly of claim 1, wherein a thickness of the insulation layer is non-uniform along the conductor core.

5. The electric winding assembly of claim 4 wherein the electric winding assembly defines an axial length between the first end and the second end of the conductor core and an end turn portion of the conductor core, and wherein the insulation layer along a portion of the end turn portion is thicker than the insulation layer along a portion of the axial length of the conductor core.

6. The electric winding assembly of claim 1, wherein the conductive shield layer is a conductive paint.

7. The electric winding assembly of claim 1, wherein the semi-conductive layer is provided over, at least, a termination point of the conductive shield layer, the termination point defining a point along the conductor core where the conductive shield layer no longer overlies the insulation layer.

8. The electric winding assembly of claim 1, wherein the semi-conductive layer is a Silicone Carbide tape.

9. The electric winding assembly of claim 1, wherein the semi-conductive layer provides a stress grading system of electric winding assembly.

10. A stator assembly, comprising:
    a stator core having a set of posts;
    a plurality of stator windings wound about at least a subset of the posts, each stator winding of the plurality of stator windings having:
      a conductor core having a first end and a distal second end;
      an insulation layer overlying the conductor core;
      a first conductive shield layer overlying the insulation layer; and
      a terminal end conductively connected with the first conductive shield layer; and
    a grounding electrical connection between each terminal end of the plurality of stator windings, the grounding electrical connection defining a common ground of the plurality of windings; and
    a second conductive shield layer overlying at least a portion of the first conductive shield layer of each stator winding of the plurality of stator windings.

11. An electric machine comprising the stator assembly of claim 10, and wherein the set of stator windings prevents partial discharge from the set of stator windings at cruise altitude atmospheric conditions of an aircraft.

12. The stator assembly of claim 10 wherein a semi-conductive layer is provided over a termination point of the first conductive shield layer of each winding of the set of windings, the termination point defining a point along the conductor core where the first conductive shield layer no longer overlies the insulation layer, wherein:
    the conductive shield layer includes a first conductivity; and
    the semi-conductive layer includes a second conductivity less than the first conductivity.

13. A method of assembling a stator, the method comprising:
    forming a conductor core;
    overlying the conductor core with an insulation layer;
    overlying the insulation layer with a conductive shield layer having a conductively connected terminal end, defining a stator winding the conductive shield layer having a first conductivity;
    overlying a termination point between the conductive shield layer and the insulation layer with a semi-conductive layer, the semi-conductive layer having a second conductivity less than the first conductivity;
    winding a set of the stator windings about a set of posts of a stator core;
    electrically coupling the terminal end to a terminal end lead; and
    conductively connecting each terminal end, via the terminal end lead, of the set of stator windings to define a common ground.

14. The method of claim 13 wherein the stator winding defines an axial length of the stator winding positioned between an adjacent subset of the set of posts, and an end turn length of the stator winding extending axially beyond the stator core, and wherein the method further comprises overlying the end turn length of the conductor core with a thickness of insulation layer that is greater than a thickness of insulation layer of the axial length of the stator winding.

15. The method of claim 13, further comprising grouping a subset of stator windings of a common conductive phase and overlying the grouping with a second conductive shield layer.

16. The method of claim 15, further comprising winding the grouping about a common subset of the set of posts.

17. The method of claim 13, further comprising grouping a subset of conductor cores overlain with respective subset of insulation layers, and wherein the overlying the insulation layer further includes overlying the subset of insulation layers with the conductive shield layer, defining a phase winding.

18. The method of claim 17 wherein winding the set of stator windings includes winding the phase winding about the set of posts.

19. The method of claim 13 wherein forming the conductor core further comprising forming a fluid passage through the conductor core.

20. The method of claim 19 further comprising fluidly coupling the fluid passage with a coolant source.

* * * * *